United States Patent [19]
Paradis

[11] 4,183,894
[45] Jan. 15, 1980

[54] MANUFACTURE OF FASTENERS USING DIRECTIVE HEATING DURING STRETCHING

[75] Inventor: Joseph R. Paradis, Wayland, Mass.

[73] Assignee: Dennison Manufacturing Company, Framingham, Mass.

[21] Appl. No.: 816,842

[22] Filed: Jul. 18, 1977

[51] Int. Cl.² .................................................. B29C 17/02
[52] U.S. Cl. ............................... 264/291; 24/150 FP; 264/297; 425/383
[58] Field of Search ................... 24/150 FP; 219/448; 425/404, 445, 446, DIG. 17, DIG. 53, DIG. 236, 805, 383; 264/334, 336, 291

[56] References Cited

U.S. PATENT DOCUMENTS

| | | | |
|---|---|---|---|
| 2,515,175 | 7/1950 | Arbogost | 264/291 |
| 3,380,122 | 4/1968 | Kirk | 264/291 |
| 3,508,553 | 4/1970 | Kanbar et al. | 264/291 |
| 3,577,987 | 5/1971 | Bronnenkant | 264/291 |
| 3,624,670 | 11/1971 | Gordon | 264/291 |
| 3,781,402 | 12/1973 | Hanggi et al. | 264/291 |

Primary Examiner—James B. Lowe
Attorney, Agent, or Firm—George E. Kersey

[57] ABSTRACT

Assemblages of fasteners formed by the molding of connected individual members which are removed from the mold and positioned as entire assemblages in end jaws that neither open nor close and are then separated while the filament portions of the fasteners are subjected to directed heat, desirably in the vicinity of the junctions of the filaments with associated cross bars, in order to controllably and substantially simultaneously stretch filaments completely to the junctions with their associated cross bars while avoiding the danger of having one or more of the simultaneously stretched filaments break because of random stretching effects.

12 Claims, 11 Drawing Figures

MANUFACTURE OF FASTENERS USING DIRECTIVE HEATING DURING STRETCHING

BACKGROUND OF THE INVENTION

This invention relates to assemblages of fasteners, and their manufacture, more particularly to assemblages of fasteners which are dispensable by machine for the tagging and attachment of articles.

Many different types of fasteners have been used for the tagging and attachment of articles. One such type, known as SWIFTACHMENTS ®, was introduced by the Dennison Manufacturing Company in 1963. The original SWIFTACHMENTS fasteners were in accordance with Bone U.S. Pat. No. 3,103,666, which issued Sept. 17, 1963 on assignment to Dennison. These fasteners were produced by molding an assemblage of individual fasteners, each with a thin filament interconnecting a cross bar with a head, and joined together by necks to a common runner bar. The SWIFTACHMENTS fasteners were dispensed using the SWIFTACHER ® gun of U.S. Pat. No. 3,103,666.

A variation of the Dennison fasteners in U.S. Pat. No. 3,103,666 is disclosed in U.S. Pat. No. 3,185,367 which issued to F. L. Rieger et al on May 25, 1965 on assignment to the Monarch Marking Systems Company. However, the Rieger fasteners did not prove to be commercially successful, and Monarch later adopted fasteners of the Dennison type, as shown in Monarch's U.S. Pat. Nos. 3,650,451 and 3,650,452 which issued in 1972 to Weiland et al and Finke, respectively.

The Dennison fasteners were also widely adopted in foreign countries as illustrated by U.S. Pat. No. 3,652,004, which was issued to Batista Lozio on March 28, 1972 and claims priority from an Italian application.

After the development of the original SWIFTACHMENTS fastener it was discovered at Dennison that fasteners of the kind shown in its patent 3,103,666; in Monarch U.S. Pat. Nos. 3,650,451 and 3,650,452; and in Lozio U.S. Pat. No. 3,652,004 could be significantly and unexpectedly improved by being stretched in the vicinity of the junctions of their filaments with cross bars. In addition, to achieve satisfactory commercial production it was necessary to be able to stretch the individual fasteners of an assemblage simultaneously.

Although the stretching of extruded filaments, for example continuous nylon monofilaments, had been well known, the stretching of molded parts was not widely known at the time of the Dennison discovery. In addition, where the stretching of molded parts had been employed, it had been for intermediate sections. It was believed at that time that if a molded filament were subjected to stretching in the vicinity of a discontinuity, for example, the junction of the filament with a cross bar, there would be breakage. Instead, there was an unexpected strengthening of the filament at the junction, which forestalled the kind of filament breakage that had been encountered in using the earlier SWIFTACHMENT fasteners of the unstretched variety shown in U.S. Pat. Nos. 3,103,666; 3,650,451; 3,650,452 and 3,652,004. Stretched fasteners of the SWIFTACHMENTS type are now the most common in the merchandising field and are now available from virtually all suppliers, including Monarch and Lozio.

Various methods for producing Dennison's stretched SWIFTACHMENTS fasteners are set forth in U.S. Pat. Nos. 3,380,122, issued Apr. 30, 1968; 3,444,597, issued May 20, 1969 and 3,457,589 issued July 29, 1969. As disclosed in those patents, the assemblages of fasteners are molded with slight tapers in a portion of their filaments in order to assure that the stretching will extend substantially to the junctions of the filaments with cross bars.

While the manufacturing methods disclosed in U.S. Pat. Nos. 3,380,122; 3,444,597 and 3,457,389 provide suitable fasteners, they require an appreciable time interval, e.g. cycle time, between molding and the completion of stretching. In addition, while the prior methods are eminently suitable for easily stretchable crystalline materials, such as nylon, they are less suitable for relatively rigid crystalline materials, such as polypropylene.

Accordingly it is an object of the invention to facilitate the production of assemblages of stretched fasteners for the tagging and attachment of articles.

Another object is to shorten the cycle time, and hence increase the production rate, for the manufacture of stretched fasteners.

A further object to achieve a method of manufacture which is of general applicability to the production of fasteners from crystalline plastic materials.

SUMMARY OF THE INVENTION

In accomplishing the foregoing and related objects the invention provides for the manufacture of an assemblage of fasteners by molding a set of connected individual fasteners and stretching the individual fasteners simultaneously while being subjected to controlled heating.

In accordance with one aspect of the invention the assemblage is fed into a stretching machine with jaws that grip the fasteners at opposite ends. The jaws are then separated to take up slack in the filaments which are simultaneously subjected to a controlled heating effect. The jaws are then separated for stretching, followed by relaxation to permit removal of the stretched assemblage from the stretching machine.

In accordance with another aspect of the invention the fasteners can be produced in a mold with separable parts, with the filaments being subjected to controlled heating as the mold parts are separated.

In accordance with further aspects of the invention the controlled heating is desirably achieved using an intra-red radiator, which has its heating effect directed to the junctions of the filaments with their end members.

In accordance with still another aspect of the invention the filaments desirably have a taper over a portion of each length in order to assure that the stretching extends to their junctions with the cross bars. However, the filaments may be of other configurations, including a generally cylindrical configuration.

In accordance with yet another aspect of the invention the fasteners are of a crystalline material whose molecules are reoriented by stretching and are desirably selected from the class consisting of nylon, polyethylene, polypropylene and polyester and acetal resins.

BRIEF DESCRIPTION OF THE DRAWINGS

Other aspects of the invention will become apparent after considering several illustrative embodiments taken in conjunction with the drawings in which.

DETAILED DESCRIPTION

Figure 1A:
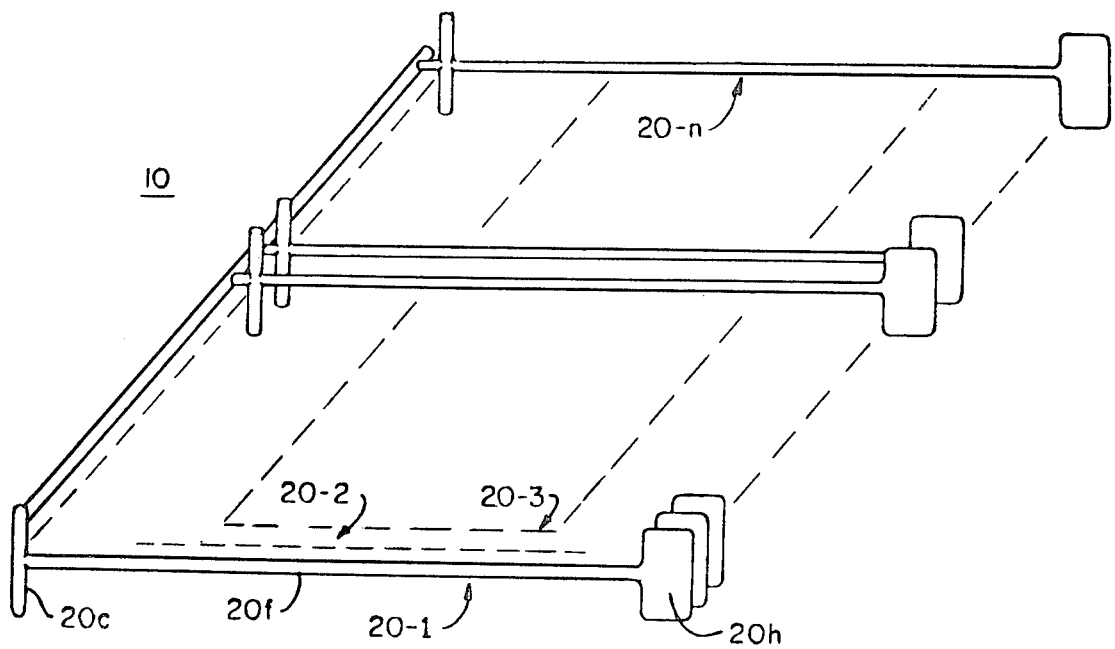
FIG. 1A is a perspective view of an assemblage of fasteners produced in accordance with the invention.

Turning to the drawings, FIG. 1A shows an assemblage 10 of individual fasteners 20-1 through 20-n which have been produced in accordance with the invention. Each individual fastener, for example the first fastener 20-1, includes a cross bar 20c which is joined to a head 20h by a filament 20f. The fasteners 20-1 through 20-n are collectively joined to a runner bar 11 by individual necks 20n, which extend from the cross bars 20c.

Figure 1B:
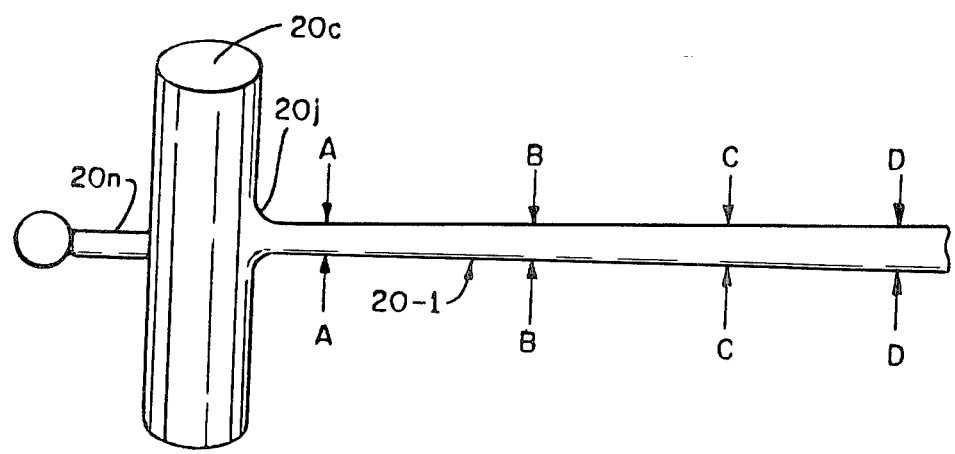
FIG. 1B is an enlargement of a portion of an individual fastener from the assemblage of FIG. 1A.

Although the filaments 20f of the fasteners 20-1 through 20-n appear to be cylindrical over the major portion of their length beginning at the cross bars 20c they typically display a region of slight taper. This is illustrated in the enlarged fragment of an individual fastener 20-1 shown in FIG. 1B. In the illustrative fastener 20-1 of FIG. 1B there is minimum diameter of approximately 0.220" at position A, located approximately 0.660" from the junction 20j of the fastener 20-1 with the cross bar 20c. The diameter of the filament 20f gradually increases to 0.240" at position B, then to 0.250" at position C and further to 0.260" at position D.

Figure 2A:
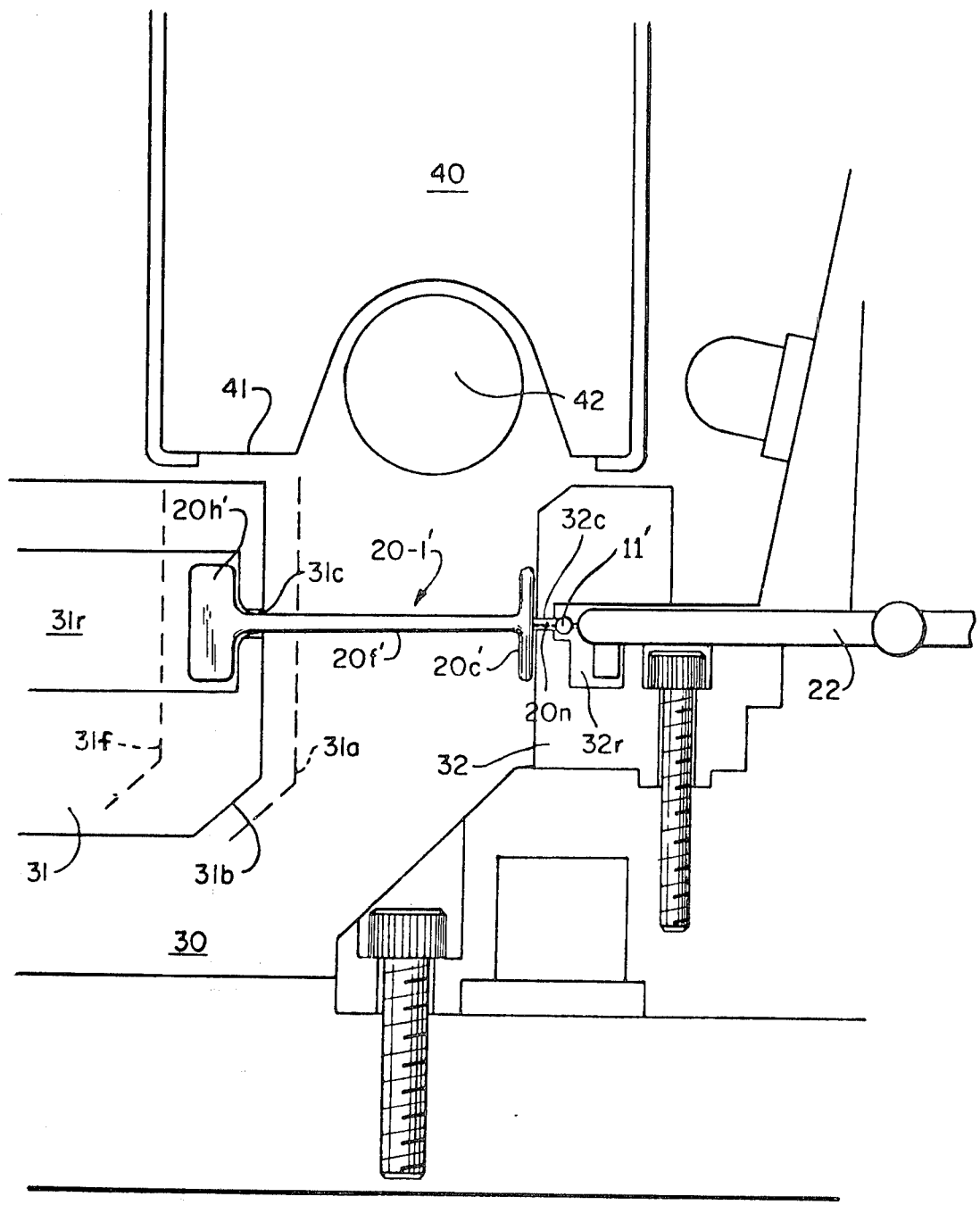
FIG. 2A is a plan view of stretching apparatus in accordance with the invention.

Stretching advantageously takes place in a machine 30 of the kind shown in FIG. 2A. The machine 30 includes an outer jaw 31 and inner jaw 32. The outer jaw has an interior region 31r for receiving one end of the product to be stretched; while the inner jaw 32 has a similar interior region 32r for the other end of the product.

Figure 2B:
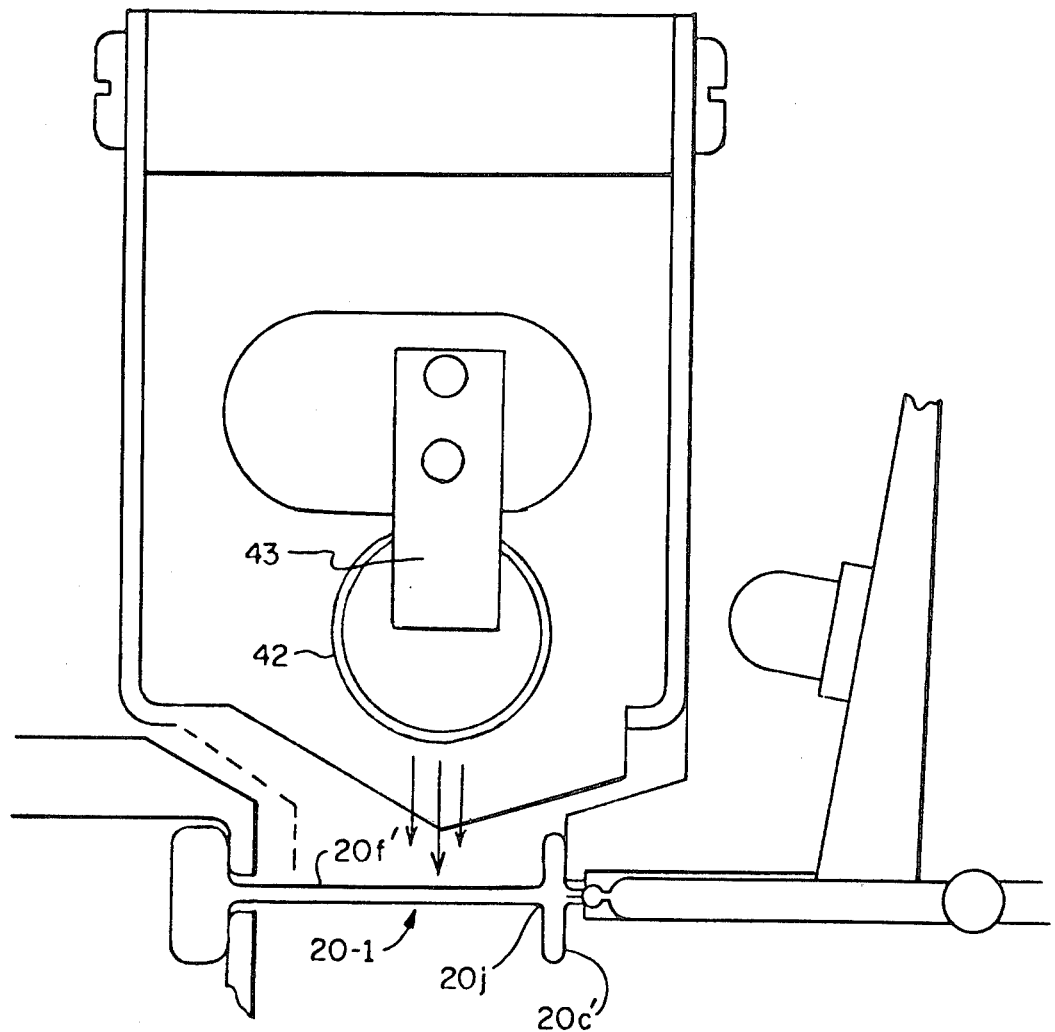
FIG. 2B is a plan view of an alternative stretching apparatus in accordance with the invention.

In the case of an assemblage of unstretched fasteners, of which only the first member 20'-1 is visible in FIG. 2B, the head of the fastener 20h' is within the interior region 31r, of the outer jaw 31 and the runner bar 11 is within the interior region 32r of the inner jaw 32.

The outer jaw 31 has a channel 31c to accommodate the portion of the filament 20'f near the head 20'h. A similar channel 32c is included in the inner jaw 32.

In the particular embodiment of FIG. 2A, the inner jaw 32 is stationary and the outer jaw 31 is separable away from the inner jaw, by, for example, a hydraulic mechanism.

It will be understood that only one-half of the machine 30 is illustrated in FIG. 2A and that a similar half is used for the concurrent stretching of another set of blanks, which are joined to the set within the jaws 31 and 32 by a connector 22.

After the asemblages of fasteners, as joined by the degatable connector 22, are fed to the machine 30, with, for example the illustrated fastener 20-1' positioned between the jaws 31 and 32. The outer jaws, for example the jaw 31, is operated to take up slack in the fastener, and illustratively moves from an initial position 31a to an intermediate position 31b.

In the general case stretching could proceed by moving the outer jaw 31 to the position 31c. To accelerate the stretching and to facilitate the stretching of stretch resistant crystallized plastic materials such as polypropylene, a controlled heat source 40 is used.

The controlled heat source 40 includes a holder 41 and a quartz infra-red lamp 42, which is described in detail below. The heat from the lamp 42 is initially applied when the outer jaw is in its position 31a. The heat effect continues to be applied as the jaw 31 moves to its final position 31f, which results in the production of the fastener shown in FIG. 1A. After stretching is completed, the jaw 31 is relaxed to permit removal of the stretched fasteners from the machine 30.

The channel 32c of the inner jaw 32 shields the neck 20'n of the fasteners, so that the gripping action of the jaw 32 is against the runner bar 11'. The shielding of the neck 20'n prevents it from being inadvertently stretched; while the gripping of the runner bar 11' prevents inadvertent damage to the cross bar 20'c.

In the embodiment of FIG. 2B, the lamp 42 is positioned in an adjustable end mount 43 in order to direct the heating to the desired portion of the filament 20'f.

The end mount 43 is adjustable in any standard way to control the direction of the infra-red radiation from the lamp 42.

Figure 3:
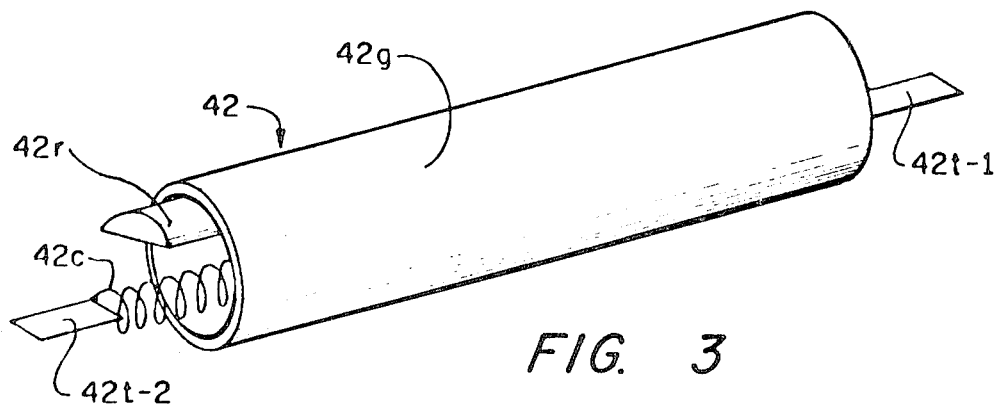
FIG. 3 is a perspective view of a heating member used in practicing the invention.

A perspective view of a portion of an illustrative lamp 42 is shown in FIG. 3. A quartz tube 42q encloses a resistor coil 42c which has terminal tabs 42t-1 and 42t-2. Above the coil 42c there is an internal reflector 42r which orthogonally directs the infra-red radiation. A representative heating unit 42 is of the kind known as a Unit Tube Infra-red Heater which is available from Hugo N. Cahnman, Associates, Inc., 125-10 Queens Blvd., Kew Gardens, N.Y. 11415. It has an infra-red emission range of 2 to 5 microns and provides a temperature between 600 and 2000° F.

The temperature H of the heat source 42 and the time T during which the fasteners are exposed to the heating effect is desirably optimized so that the product of the heating effect and the temperature is below the value which would cause melting of the fasteners.

The internal reflector 42r of the heat source 42 can cause about 85% of the radiated energy to be directed at the product.

Figure 4A:
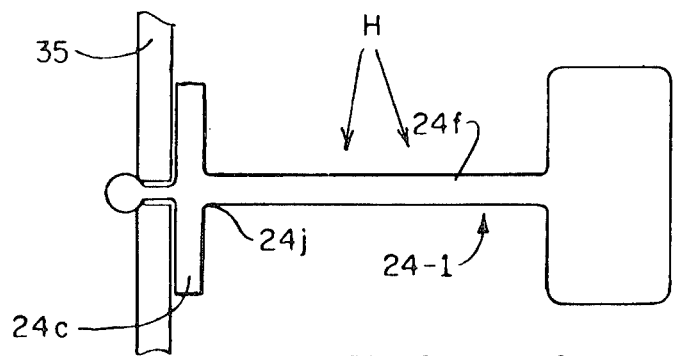
FIGS. 4A and 4B are views illustrating an alternative practice of the invention.
Figure 4B:
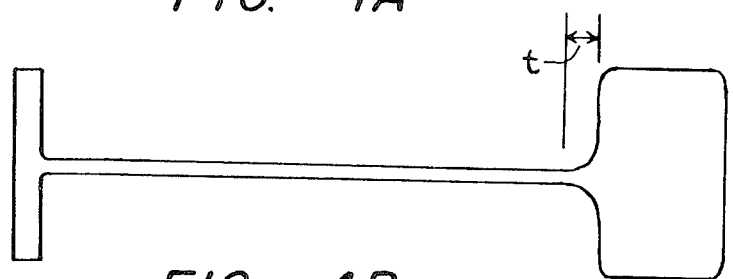

An alternative form of fastener is shown in the jaw 35 in FIG. 4A. For the individual fastener 24-1 of FIG. 4A the filament 24f is substantially cylindrical throughout the major portion of its length. Because of the heat effect H, stretching takes place as illustrated in FIG. 4B. Since the filament is of cylindrical cross section its stretched counterpart is also substantially cylindrical. However, there is a slight region of taper t near the head. The cylindrical filament 24f, although more difficult to control, does not require as great a mold expense and avoids the possibility of having a region of excessive thickness which could lead to inadvertent fracture during stretching.

Figure 5:
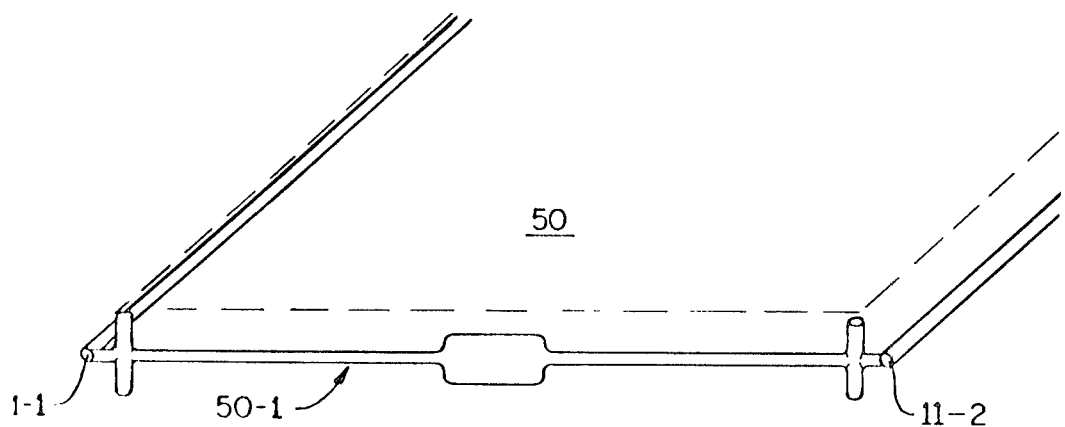
FIG. 5 is a perspective view of a further embodiment of the invention.

As shown in FIG. 5 an assemblage 50 of fasteners which is stretched using cylindrical filaments 50f has cross bars 50c-1 and 50c-2 at opposite ends and runner bars 11-1 and 11-2 associated with the respective cross bars. One of the runner bars 11-1 or 11-2 can be used to permit machine feed in accordance with the patents mentioned above. The other runner bar 11-1 or 11-2 gives stiffness to the assemblage 50 and facilitates their being handled during stretching operations where controlled heating is employed. One of the runner bars can be removed by degating at the completion of the stretching operation. It will be apparent that an auxiliary runner bar to facilitate handling in stretcher operations which employ controlled heating can be used for other kinds of fasteners and devices.

Figure 6A:
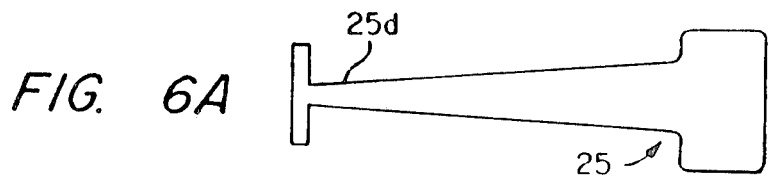
FIGS. 6A through 6C are perspective views of alternative unstretched assemblages for use with the invention.
Figure 6B:
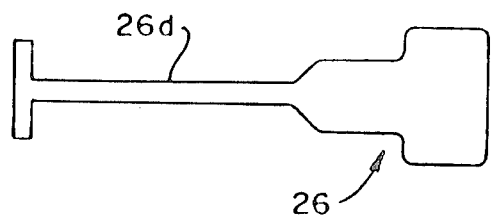
Figure 6C:
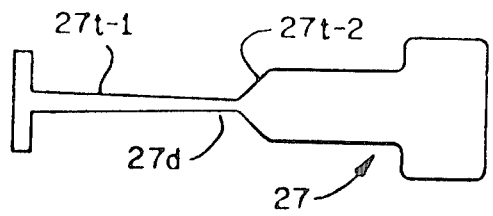

Other kinds of blanks for use with the invention are shown in FIGS. 6A through 6C. In FIG. 6A the illustrative unstretched fastener 25 has its minimum diameter 25d a short distance from the cross bar 25c. In FIG. 6B the fastener 26 has a substantially cylindrical filament 26 with a minimum diameter in an intermediate position 26d. In FIG. 6C the minimum diameter 27d is at the junction of a decreasing taper 27t-1 (beginning at the cross bar 27c) and a forward taper 27t-2.

When uniform heating is applied to the filaments 25f, 26f and 27f in FIGS. 6A through 6C stretching begins at the minimum diameter positions 25d, 26d and 27d and progresses in the direction of the succeeding minima. Thus in the case of FIG. 6C, since the second taper 27t-2 has a higher shoulder than the first taper 27t-1, stretching takes place to the junction 27j before there is any significant stretching in the region of the forward taper 27t-2.

While various aspects of the invention have been set forth by the drawings and the specification, it is to be understood that the foregoing detailed description is for illustration only and that various changes in parts, as well as the substitution of equivalent constituents for those shown and described, may be made without departing from the spirit and scope of the invention as set forth in the appended claims.

What is claimed is:

1. The method of manufacturing an assemblage of fasteners which comprises the steps of
   (a) molding the assemblage as a set of connected individual fasteners, each including an end member which is joined by a filament, and
   (b) stretching the individual fasteners simultaneously while subjecting them to controlled heating at the junctions of their filaments with their end members, with said controlled heating being directed to the filaments simultaneously.

2. The method of claim 1 wherein each individual filament includes a taper over a portion of its length.

3. The method of claim 1 wherein the individual fasteners are connected at one end by a common member and the stretching takes place using jaws which grasp said common member and the other end of said fasteners.

4. The method of claim 1 wherein the individual fasteners are joined at opposite ends by common members and the stretching is accomplished using jaws which grasp said common members.

5. The method of claim 1 wherein said controlled heating is provided by infrared radiation.

6. The method of claim 1 wherein the assemblage is fed into a stretching machine with jaws which grip the fasteners at opposite ends and the jaws are separated to take up slack in the fasteners while causing their filaments to become controllably heated, after which the jaws are separated to stretch the filaments simultaneously and are then relaxed to free the assemblage of stretched fasteners and permit their removal.

7. The method of claim 6 wherein the heat H in BTUs per hour and the time of exposure T in hours of the product HT is below the threshold of melting for the fasteners.

8. The method of claim 1 wherein said assemblage is formed in a mold with separable parts and the parts are separated to stretch the fasteners while subjecting them to said controlled heat.

9. The method of claim 1 wherein said controlled heating is directed to the junction of each filament with its cross bar simultaneously for each fastener of said assemblage.

10. The method of claim 1 wherein the material of the fasteners is a crystalline substance whose molecules are reoriented by stretching.

11. The method of claim 1 wherein the material is selected from the class consisting of nylon, polyethylene, polypropylene and polyester and acetyl resins.

12. The method of claim 1 wherein said fasteners are molded from polypropylene material which is resistant to cold stretching.

* * * * *

UNITED STATES PATENT AND TRADEMARK OFFICE
CERTIFICATE OF CORRECTION

PATENT NO. : 4,183,894
DATED : Jan. 15, 1980
INVENTOR(S) : Joseph R. Paradis

It is certified that error appears in the above—identified patent and that said Letters Patent is hereby corrected as shown below:

Delete the language in column 1, lines 27 through 31, namely, "However, the Rieger fasteners did not prove to be commercially successful, and Monarch adopted fasteners of the Dennison type, as shown in Monarch's U.S. patent Nos. 3,650,451 and 3,650,452 which issued to Weiland et al and Finke, respectively." and column 1, lines 63 and 64, namely, "and are now available from virtually all suppliers, including Monarch and Lozio".

Signed and Sealed this

Fifth Day of October 1982

[SEAL]

Attest:

Attesting Officer

GERALD J. MOSSINGHOFF
Commissioner of Patents and Trademarks